Patented Feb. 11, 1941

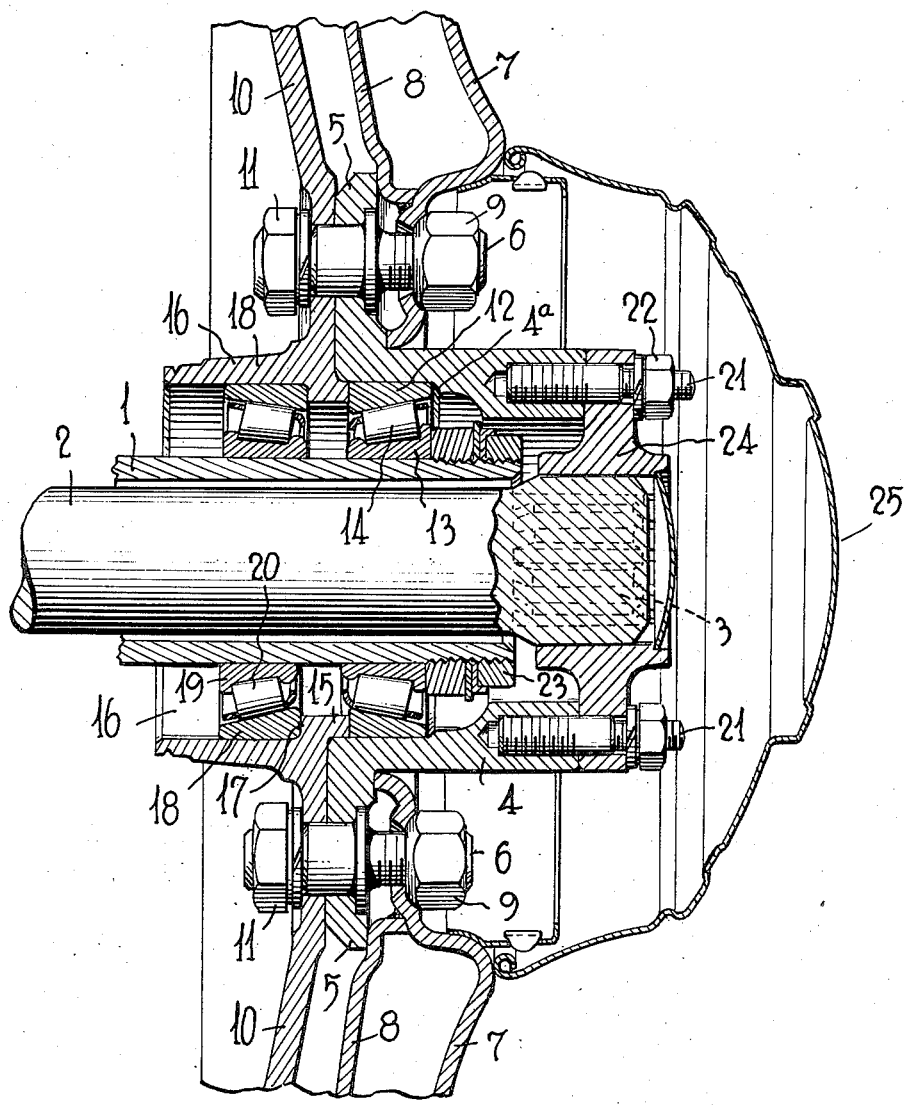

2,231,207

UNITED STATES PATENT OFFICE 2,231,207

WHEEL AND BEARING ASSEMBLY

Paul E. Baker, Detroit, Mich., assignor to Budd Wheel Company, Philadelphia, Pa., a corporation of Pennsylvania Application September 29, 1938, Serial No. 232,339

8 Claims. (Cl. 301—6)

This invention relates to vehicle wheels and bearings, and more particularly to a bearing assembly for driving wheels and axles of the full floating type.

Specifically, the present invention is in the nature of an improvement upon the construction shown in my prior Patent No. 2,052,524, dated August 25, 1936.

The object of the present invention is to still further simplify the positioning of the anti-frictiong bearings, and the assembly of the wheel hub on the axle housing. To this end, the invention contemplates constructing the brake drum in such a manner that the drum itself constitutes in effect a continuation of the wheel hub, and serves to house one of the anti-friction bearings. The drum is also so constructed that it serves to maintain the two bearings in proper spaced relation.

In order that the invention may be readily understood, reference is had to the accompanying drawing, forming part of this specification, and which is a central transverse section through a wheel hub and associated parts, made in accordance with the invention.

Referring to the drawing in detail, I designates the usual fixed axle housing within which is disposed the freely floating driving axle 2, having the usual splines on its outer end, as indicated at 3.

The wheel hub, proper, is shown at 4, and is provided at its inner side with a radially extending bolting flange 5. This flange carries the usual studs 6 to which the wheel is secured by means of nuts 9. The wheel illustrated is of the pressed steel artillery type comprising a main stamping 7 and an auxiliary stamping 8, but any other type of wheel adapted to be secured to the hub flange may, of course, be employed.

10 designates the brake drum which is attached to the hub flange 5 by means of the bolts or studs 6, and is secured in position by nuts 11.

Fitting snugly within the hub portion 4 is an anti-friction bearing comprising outer and inner concentric annular raceways 12 and 13 having suitable rolling elements 14 interposed between them. This bearing is adapted to be inserted into the hub from the inner side thereof into a position somewhat outwardly beyond the plane of the inner face of the bolting flange 5, in which position it is stopped by an internal shoulder 4ª.

The brake drum is provided at its outer side with an annular flange or cylindrical portion 15 which extends radially inwardly of the hub portion 4 and which fits snugly within the inner end of the hub opening therein and bears against the raceway 12 so as to hold the anti-friction bearing in position.

The drum is also formed, at a point inwardly of the bolt circle, with a second annular flange or cylindrical portion 16 projecting axially from the inner side of the drum, and of somewhat larger diameter than the flange 15. The cylindrical bore formed within the flange 16 is provided adjacent the hub with an annular shoulder 17. A second anti-friction bearing comprising outer and inner concentric annular raceways 18 and 19, with roller elements 20 interposed between them, is mounted within the bore of the flange 16. This bearing is insertable into such bore from the inner side of the wheel into a position in contact with the shoulder 17.

From the foregoing, it will be seen that the axially extending flange 16 of the brake drum constitutes, in effect, a second hub portion which forms a continuation of the hub portion 4, the diameter of the interior of such flange being the same as that of the hub opening, so that the two anti-friction bearings may be identical.

It will be further noted that the brake drum, in addition to housing one of the anti-friction bearings, is provided with a portion projecting radially inward of the hub opening and interposed between the two bearings so as to maintain them in spaced relation.

While I have referred to the portions 15 and 16, as forming part of the brake drum, it is obvious that, in the broader aspects of the invention, it is immaterial whether or not they constitute part of the brake drum, so long as they are rigidly connected with the hub portion 4. Thus the flange 16 may be aptly described as an axially extended member having a cylindrical bore, and constituting an auxiliary hub portion cooperating with the main hub portion 4, while the flange 15 is integral therewith and extends radially inward of the bore thereof.

In assembling my improved wheel and bearing construction, the bearing 12, 13 is first inserted in the inner end of the opening in the hub portion 4. The brake drum, having the members 15 and 16, with the bearing 18, 19 mounted therein, is then secured to said hub portion. Then the entire wheel hub and drum assembly, carrying the two bearings, is pushed onto the axle housing 1 from the outer end thereof, the inner raceways 13 and 19 snugly fitting this housing, and the bearings are secured in position by means of suitable nuts 23 threaded onto the end of the axle housing, as in my said prior patent. Also, as in my prior patent, I provide a sleeve cap or similar member 24 which is splined onto the end 3 of the live axle 2. This is placed in position after the wheel and bearing assembly have been mounted on the axle housing 1, and is attached to the main hub portion 4 by means of threaded pins or bolts 21 and nuts 22. Thus a driving connection with the wheel hub is established. A hub cap or cover 25 of any suitable design encloses the hub and axle assembly on the outer side of the wheel.

What I claim is:

1. In a wheel and bearing assembly, a wheel hub portion having an opening to receive an axle, an antifriction bearing comprising concentric annular raceways and interposed rolling elements, said bearing being insertable into the hub opening from the inner side of said hub portion, an axially extended member secured to the inner side of said hub portion and having a cylindrical bore and an annular portion of smaller diameter than the bore fitting within the opening of said hub portion, and a second antifriction bearing mounted wholly within said bore and spaced from the first bearing by said annular portion extending between them.

2. In a wheel and bearing assembly, a wheel hub portion having an opening to receive an axle, an antifriction bearing comprising concentric annular raceways and interposed rolling elements, said bearing being insertable into the hub opening from the inner side of said hub portion, an axially extended member secured to the inner side of said hub portion and having a cylindrical bore provided, at the end adjacent said hub portion, with an annular shouldered portion for engaging and locating the bearing in said hub portion, and a second antifriction bearing mounted within said bore and positioned against said shouldered portion.

3. In a wheel and bearing assembly, a wheel hub portion having an opening to receive an axle, an antifriction bearing comprising concentric annular raceways and interposed rolling elements, said bearing being insertable into the hub opening from the inner side of said hub portion, an axially extended member secured to the inner side of said hub portion and having a cylindrical bore, and a second antifriction bearing mounted wholly within said bore, said axially extended member having a portion extending radially inward of said hub opening at a point between said bearings and serving as a spacer extending between the bearings to space them apart.

4. In a wheel and bearing assembly, a wheel hub portion having an opening to receive an axle, an antifriction bearing comprising concentric annular raceways and interposed rolling elements, said bearing being insertable into the hub opening from the inner side of said hub portion, a disc like member secured to the inner side of said hub portion and having central annular flanges projecting axially from opposite sides thereof, one of said flanges entering the opening of said hub portion and engaging said bearing to hold it in position, and a second bearing mounted within the other flange.

5. In a wheel and bearing assembly, a wheel hub portion having an opening to receive an axle and also having a radial bolting flange, a wheel body and an annular member mounted on said flange, an antifriction bearing insertable into the hub opening from the inner side of said hub portion to a position outwardly beyond the plane of the inner face of said flange, said member having a portion engaging said bearing to hold it in position, and said member also having, at the inner side thereof, an axially extending cylindrical portion, and a second antifriction bearing housed within said cylindrical portion.

6. In a wheel and bearing assembly, a wheel hub portion having an opening to receive an axle and an antifriction bearing insertable in said opening from the inner side of said hub portion, and said hub portion also having a radial bolting flange, an annular member bolted to said flange, said member being formed, at a point radially inward of the bolt circle, with an axially extending cylindrical portion having, adjacent said hub portion, an internal shouldered portion engaging and locating said antifriction bearing, and a second antifriction bearing insertable into said cylindrical portion from the inner side of the wheel to a position against said shouldered portion.

7. In a wheel and bearing assembly, a wheel hub portion having an opening to receive an axle and an antifriction bearing insertable in said opening from the inner side of said hub portion, and said hub portion also having a radial bolting flange, an annular member bolted to said flange, said member being formed, at a point radially inward of the bolt circle, with two cylindrical portions projecting axially from opposite sides thereof and of different diameters, the smaller of said portions fitting within the opening of said hub portion, and a second antifriction bearing mounted within the larger of said cylindrical portions and insertable therein from the inner side of the wheel, the said smaller portion extending between and spacing the bearings.

8. In a wheel and bearing assembly, a main wheel hub portion having an opening to receive an axle, a brake drum secured to said hub portion and having at its inner side an axially projecting annular flange constituting in effect an auxiliary hub portion and of the same internal diameter as the opening in said main hub portion, a pair of spaced antifriction bearings, one mounted within the main hub portion, and the other mounted within the said flange constituting the auxiliary hub portion, and a spacing abutment integral with said brake drum and extending between and spacing said bearings.

PAUL E. BAKER.